(12) United States Patent
Nakamura et al.

(10) Patent No.: US 6,276,827 B1
(45) Date of Patent: Aug. 21, 2001

(54) CASSETTE TRAY FOR RADIOGRAPHY

(75) Inventors: Toshiaki Nakamura, Otsu; Goroh Hirata, Kyoto; Masahiro Kawano, Katano; Toshio Kadowaki, Kyoto, all of (JP)

(73) Assignee: Shimadzu Corporation, Kyoto (JP)

( * ) Notice: Subject to any disclaimer, the term of this patent is extended or adjusted under 35 U.S.C. 154(b) by 0 days.

(21) Appl. No.: 09/371,278

(22) Filed: Aug. 10, 1999

(30) Foreign Application Priority Data

Aug. 28, 1998 (JP) .................................................. 10-243914

(51) Int. Cl.$^7$ ...................................................... G03B 42/02
(52) U.S. Cl. ............................ 378/167; 378/181; 378/182
(58) Field of Search ................................... 378/167, 172, 378/173, 174, 175, 181, 182

(56) References Cited

U.S. PATENT DOCUMENTS

| | | | |
|---|---|---|---|
| 3,826,922 | * 7/1974 | Ingles | 378/181 |
| 3,829,698 | * 8/1974 | Goetz | 378/181 |
| 4,416,020 | * 11/1983 | Wagner et al. | 378/181 |
| 4,894,854 | * 1/1990 | Guba et al. | 378/181 |
| 5,224,148 | * 6/1993 | Baker, Jr. et al. | 378/181 |

* cited by examiner

Primary Examiner—Robert H. Kim
Assistant Examiner—Allen C Ho
(74) Attorney, Agent, or Firm—Kanesaka & Takeuchi

(57) ABSTRACT

In a cassette tray for radiography, a positioning plate is provided on a rear surface of a tray, and the positioning plate includes grooves corresponding to cassette sizes. A stopper for holding a cassette has a spring, and engaging pieces which engage the groove and formed at a lower end of a slider moving vertically between a front plate of the tray and the positioning plate. When the engaging pieces of the stopper engage the grooves, the stopper projects from the front surface of the tray to hold the cassette at the position. When the engaging pieces of the stopper do not engage the grooves, the stopper is located on the same plane as the front plate surface of the tray. If the stopper is pressed and moved along the surface of the tray, the position for the cassette to be used can be selected. Accordingly, the cassette tray can securely hold various-sized cassettes, and the attaching operation therefor can be carried out easily in a short period of time.

8 Claims, 3 Drawing Sheets

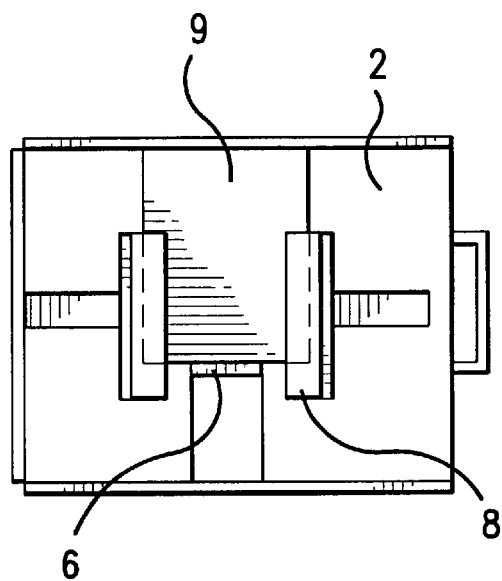
FIG.1(a)          FIG.1(b)
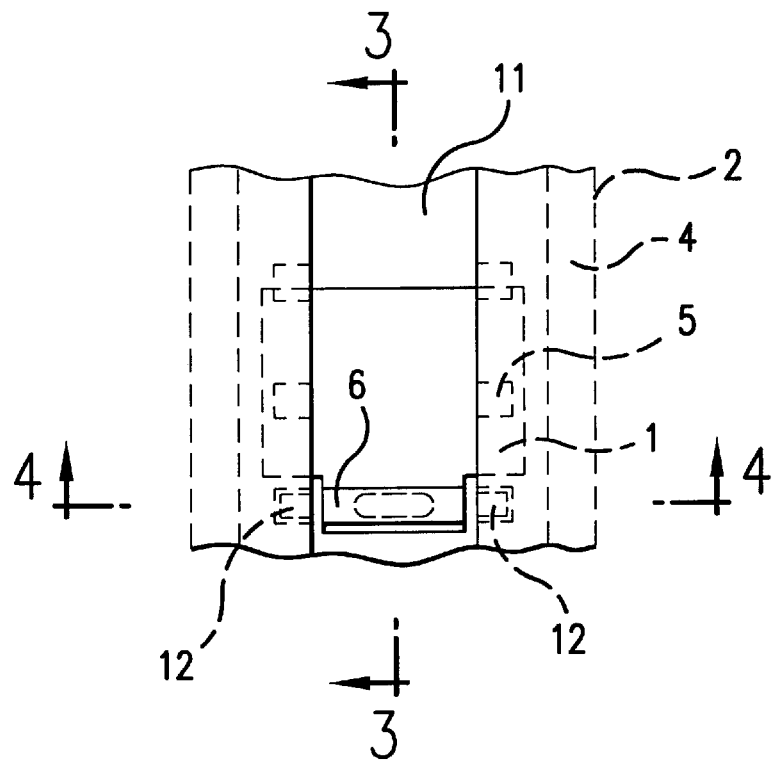
FIG.2

CASSETTE TRAY FOR RADIOGRAPHY

BACKGROUND OF THE INVENTION AND RELATED ART STATEMENT

The present invention relates to a cassette tray for radiography to be attached inside an image receiving section on an X-ray direct photographing table, and more particularly, the invention relates to a mechanism for positioning an X-ray film cassette tray.

X-ray diagnostic radiography or X-ray photographing has been carried out mostly on a direct radiography or X-ray photographing table. As a typical direct radiography table, there is a standing-type radiography table. In this radiography table, a column of a stand is provided with an X-ray image receiving section, and the X-ray image receiving section moves up and down along guide rails disposed on both side walls of the column so that an X-ray image is directly recorded on a film.

FIGS. 6(a) and 6(b) show a cassette tray attached to the aforementioned radiography table. In order to take radiograph or X-ray photograph, a cassette 9 is held at right and left sides thereof by holding plates 8 disposed at both sides of a tray 2, and a lower part of the cassette 9 is supported by a spacer 10 having a size corresponding to a size of the cassette. As described above, the cassette 9 is set in the tray 2 and is disposed on the radiography table to take radiograph.

As cassettes without side grooves used for general radiography, seven kinds of the cassettes having the following sizes are standardized in JIS-Z4905 according to IEC (International Electrotechnical Commission) standard, wherein the sizes of these seven cassettes are as follows: 388 mm×464 mm (for a half-cut size, JK14×17); 388 mm×388 mm (for a large square size, JK14×14); 313 mm×388 mm (for a continental size, JK11×14); 286 mm×337 mm (for a quarter-cut size, JK10×12); 235 mm×286 mm (for sixth-cut size, JK8×10); 198 mm×248 mm (for eighth-cut size, JK6½×8½); and 153 mm×198 mm (for a cabinet size, JK4½×6½). Therefore, in order to precisely attach the various-sized cassettes 9 at a central upper position of the cassette tray 2, it is necessary to prepare five kinds of the spacers 10 having different heights.

The conventional cassette tray for general photographing is structured as described above. In order to securely attach the various-sized cassettes 9 to the central upper position of the tray 2, it is necessary to set the spacer 10 corresponding to the size of the cassette, and to move the holding plates 8 at both sides of the tray 2 to both sides of the cassette 9 for holding the same securely. However, in this case, there are problems that the size of the spacer 10 prepared during an operation may be selected incorrectly, and the spacer 10 might be dropped on a floor while being set.

The present invention has been made in view of the above problems, and an object of the present invention is to provide a cassette tray for radiography wherein various-sized cassettes can be securely held at a central upper position of a tray to be held inside an image receiving section of a direct X-ray photographing table.

Another object of the invention is to provide a cassette tray 2 as stated above, wherein an operation for setting the cassette can be easily carried out in a short period of time.

Further objects and advantages of the invention will be apparent from the following description of the invention.

SUMMARY OF THE INVENTION

To achieve the above objects, the present invention provides a cassette tray for radiography, which is formed of a tray; a positioning plate disposed on a rear surface of the tray; a sliding member disposed between the tray and the positioning plate; and a cassette receiving member disposed at a lower end portion of the sliding member. The cassette tray further includes means for projecting and retracting the cassette receiving member in the front and rear directions relative to a lower end surface of the cassette and the front surface of the tray by a spring. The tray and the positioning plate include notches having the widths such that the cassette receiving member vertically moves through the notches. The positioning plate has grooves at positions corresponding to sizes of cassettes, and the cassette receiving member has engaging pieces for engaging the grooves in the positioning plate. The cassette is held in the tray by the cassette receiving member.

In the cassette tray for radiography of the invention, when the engaging pieces of the cassette receiving member engage the grooves in the positioning plate corresponding to the cassette size installed therein, the receiving member projects from the front surface of the tray, so that the cassette can be securely held at the central upper position of the tray. Also, when the largest cassette is set in the tray, or when there is no need to hold a cassette, the cassette receiving member is pressed, and moved to disengage the engaging pieces from the grooves. Accordingly, the cassette receiving member can be situated in a condition that it does not project from the front surface of the tray.

BRIEF DESCRIPTION OF THE DRAWINGS

FIG. 1(a) is an explanatory front view showing an embodiment of a cassette tray for radiography according to a present invention;

FIG. 1(b) is a side view of the cassette tray shown in FIG. 1(b);

FIG. 2 is a plan view of a positioning mechanism of the invention;

DETAILED DESCRIPTION OF PREFERRED EMBODIMENTS

Figure 3:
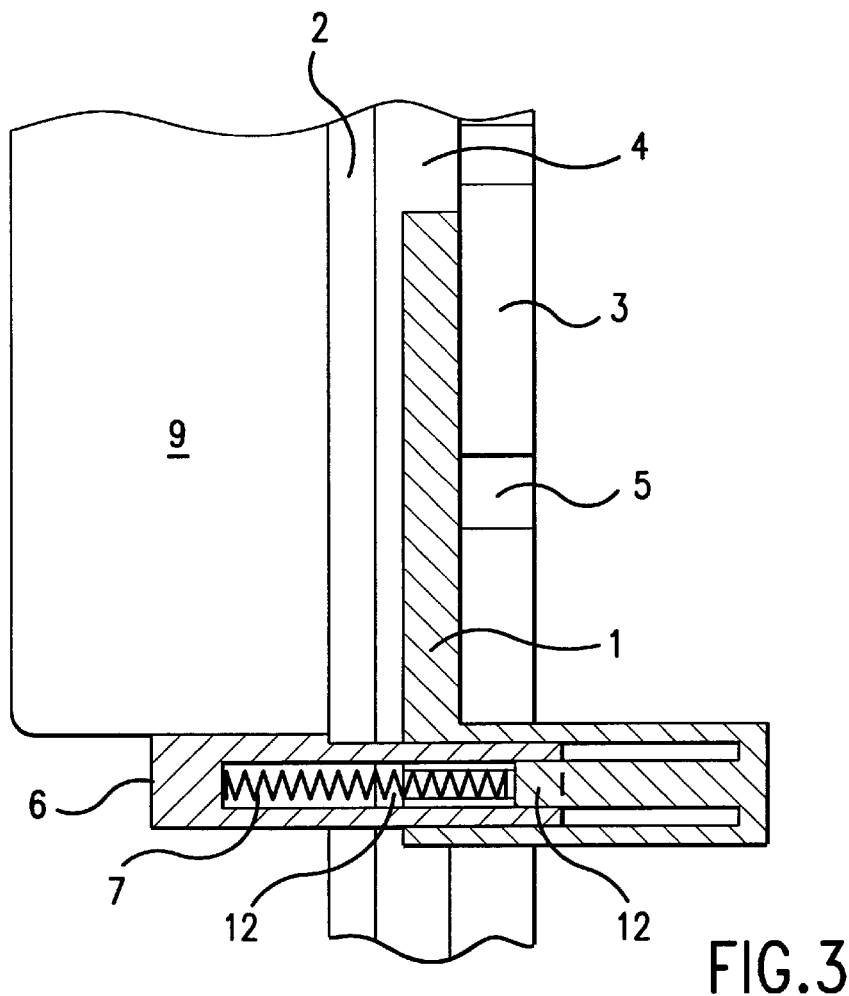
FIG. 3 is a longitudinal cross sectional view taken along line 3—3 in FIG. 2.

An embodiment of a radiography cassette tray according to a present invention will be explained with reference to FIG. 1 through FIG. 3. FIG. 1 shows an appearance in a condition that a cassette 9 is positioned to a center of a tray 2 by holding plates 8 which hold both sides of the cassette 9 according to an X-ray film cassette positioning mechanism of the invention, and is securely held at an upper part by a stopper 6, i.e. metal member for receiving the cassette, according to the positioning mechanism of the invention. The stopper 6 has a mechanism capable of moving up and down, or vertically, by pressing the same as described later, and the stopper 6 projects from a front surface of the tray 2 at a necessary position corresponding to a cassette size, as described later.

FIG. 2 is a plan view of the tray 2 as seen from a holding side in a condition that a cassette 9 is not held. FIG. 3 is a vertical cross sectional view taken along line 3—3 in FIG. 2 in a condition that the cassette 9 is held at the tray 2 by the stopper 6. Notches 11 having a width in which the stopper 6, i.e. metal member for receiving a cassette, can move vertically, are formed in the tray 2 and a positioning plate 3, and the stopper 6 can move up and down along the notches 11. In the positioning plate 3, grooves 5 are provided at positions corresponding to cassette sizes to be installed and a radiography standard. A pitch of the grooves 5 is determined according to seven kinds of the cassette sizes (sizes standardized by JIS-Z4905 in accordance with IEC standard). If the tray 2 has a size for holding the largest cassette, by providing the grooves 5 at least five positions in the positioning plate 3, a cassette with any size can be attached according to the mechanism of the invention.

Spacers 4 are disposed between the tray 2 and the positioning plate 3 to form a slidable center space therebetween, and a slider 1 can move up and down in the slidable center space defined by the tray 2, positioning plate 3 and the spacers 4. The stopper 6 is attached to a lower end of the slider 1 by a spring 7, so that the stopper 6 can project in the front and rear directions between a front surface of the tray 2 and a lower end surface of the cassette 9. In the stopper 6, engaging pieces 12 for engaging the grooves 5 in the positioning plate 3 project at both sides in a horizontal direction of a lower part of the stopper 6. The engaging piece 12 is shaped to have a width for allowing the engaging piece 12 to be fitted in the groove 5 in the positioning plate 3, and a thickness of an approximately total of thicknesses of the spacer 4 and the positioning plate 3. At a position where the engaging pieces 12 engage the grooves 5 of the positioning plate 3, the stopper 6 projects from the front surface of the tray 2.

The engaging pieces 12 disposed at both ends of the stopper 6 engage the grooves 5 by a force of the spring 7 inserted between the slider 1 and the stopper 6, and the stopper 6 is pushed upwardly until the upper surfaces of the engaging pieces 12 hit a rear surface of the tray 2. Thus, the stopper 6 projects from the front surface of the tray 2 to be able to hold the cassette 9.

Figure 4:
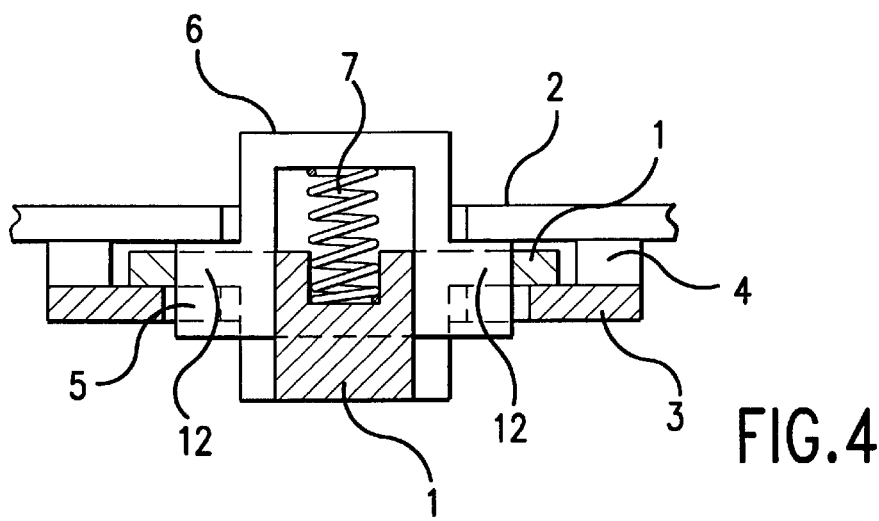
FIG. 4 is a vertical cross sectional view taken along line 4—4 in FIG. 2, wherein a stopper is at a high position.

FIG. 4 is a lateral cross sectional view taken along line 4—4 in FIG. 2 showing a condition that the stopper 6 projects from the front surface of the tray 2. Namely, the engaging pieces 12 of the stopper 6 engage the grooves 5.

Figure 5:
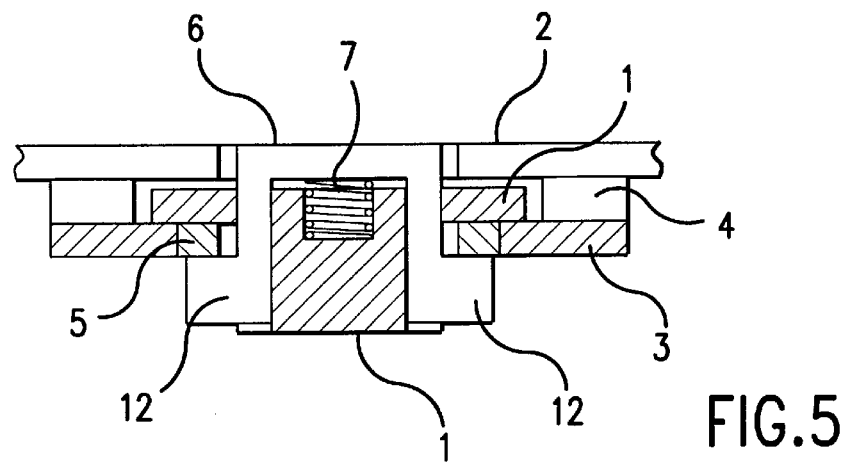
FIG. 5 is a vertical cross sectional view, similar to FIG. 4, wherein the stopper is at a low position.

FIG. 5 is a lateral cross sectional view showing a condition that the stopper 6 is located in the same level as the front surface of the tray 2. Namely, the engaging pieces 12 of the stopper 6 do not engage the grooves 5.

Hereunder, an operation of the positioning mechanism of the invention when the cassette 9 is attached to the tray 2 is explained. Firstly, a cassette 9 corresponding to a portion of an examinee or a patient to be photographed is selected. A film and an intensifying screen are mounted in the cassette 9, and the cassette 9 is brought to the direct photographing table. Then, the tray 2 is drawn out. The holding plates 8 at both sides of the tray 2 are extended toward both sides, and the cassette 9 is placed in the tray 2 to abut against the upper end of the tray 2. Then, the stopper 6 is pushed until the upper surface of the stopper 6 comes to the same plane as the upper surface of the tray 2, so that the engaging pieces 12 provided at both sides and disposed at the lower end of the stopper are lowered to the lowest position as shown in FIG. 5.

In this condition, the engagement of the engaging pieces 12 with the grooves 5 of the positioning plate 3 is released, and by further pushing the stopper 6 parallel to the upper surface of the tray 2 in this condition, the slider 1 engaging the stopper 6 slides in the space formed by the spacer 4. When the force applied to the stopper 6 is released at the position corresponding to the cassette size to be photographed, as shown in FIG. 4, by the force of the spring 7 inserted between the slider 1 and the stopper 6, the engaging pieces 12 disposed at both sides of the lower end of the stopper 6 are elevated to engage the grooves 5 of the positioning plate 3. Thus, the stopper 6 projects from the front surface of the tray 2; and the position is fixed. The stopper 6 positions the cassette 9 at the predetermined position. Then, by sandwiching the cassette 9 by the holding plates 8 at both sides, the cassette 9 is fixed.

In the aforementioned embodiment, even if the groove 5 of the positioning plate 3 is formed of a hole and a shaft, the same effects can be attained.

Figure 7:
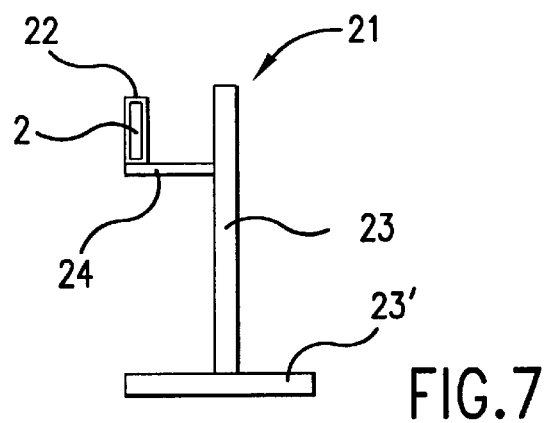
FIG. 7 is an explanatory view of a direct radiography table, wherein the cassette tray for radiography of the invention is attached in an X-ray image receiving section.
Figure 6A:
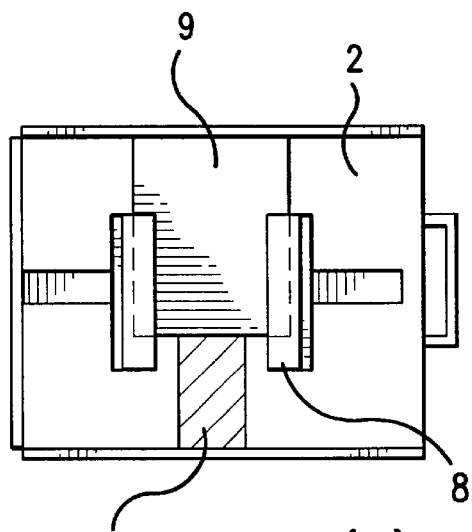
FIG. 6(a) is an explanatory top plan view showing a conventional cassette tray for radiography.
Figure 6B:
FIG. 6(b) is a side view of the conventional cassette tray show in FIG. 6(a)

FIG. 7 shows an explanatory view of a direct radiography table 21, wherein the tray 2 of the invention is attached to an X-ray image receiving section 22. As shown in FIG. 7, the X-ray image receiving section 22 is attached to a column 23 of a stand 23' through a holding portion 24 which can move vertically. The position of the tray 2 is set by the direct radiography table 21, and the X-ray film in the tray 2 is taken, as in the conventional system.

The cassette tray for radiography of the invention is structured as described above, and by pushing the stopper 6 until the upper surface of the stopper 6 is located in the same plane as the front surface of the tray 2, the engagements between the engaging pieces 12 and the grooves are released. Then, by further pushing the stopper 6 parallel to the front surface of the tray 2, the stopper 6 is moved to the position corresponding to the cassette size to be photographed. When the force against the stopper is released, the stopper 6 projects from the front surface of the tray 2 and is fixed thereat. Thus, a position of the cassette can be easily set at a predetermined position in a short period of time. The spacer 10 corresponding to the cassette size to be photographed is no longer required.

Also, when the largest cassette 9 is set, or when the cassette 9 is not required to be held, the stopper 6 is pressed and moved to disengage the engaging pieces 12 from the grooves 5. Accordingly, it is possible to locate the stopper not to project from the front surface of the tray. Thus, an outer size of the cassette tray can be minimized.

While the invention has been explained with reference to the specific embodiments of the invention, the explanation is illustrative and the invention is limited only by the appended claims.

What is claimed is:

1. A cassette tray for radiography, comprising:

a tray for receiving a cassette therein, said tray having a first notch, and front and rear surfaces, a positioning plate disposed at the rear surface of the tray and having a second notch corresponding to the first notch and at least one groove at a position corresponding to a size of the cassette, a sliding member slidably disposed between the tray and the positioning plate and having a lower end portion, and a cassette receiving member attached to the lower end portion of the sliding member for holding the cassette, said cassette receiving member being capable of moving in front and rear directions through the first and second notches between a lower position and an upper position projecting from the front surface of the tray, said cassette receiving member having at least one engaging piece for engaging the at least one groove in the positioning plate.

2. A cassette tray for radiography according to claim 1, wherein said positioning plate includes a plurality of grooves corresponding to different sizes of cassettes.

3. A cassette tray for radiography according to claim 2, wherein said at least one engaging piece engages one of the grooves when the cassette receiving member is in the upper position, and does not engage the grooves when the cassette receiving member is in the lower position to allow the cassette receiving member to move in a different position.

4. A cassette tray for radiography according to claim 3, wherein said lower position substantially corresponds to the front surface of the tray.

5. A cassette tray for radiography according to claim 3, wherein said cassette receiving member includes a spring to urge the cassette receiving member to move to the upper position.

6. A cassette tray for radiography according to claim 5, further comprising a pair of lateral plates disposed on the front surface of the tray for holding the cassette therebetween.

7. An X-ray direct photographing table, comprising, an image receiving section, and a cassette tray for holding a cassette therein to be removably situated in the image receiving section, said cassette tray comprising:

a tray for receiving a cassette therein, said tray having a first notch, and front and rear surfaces, a positioning plate disposed at the rear surface of the tray and having a second notch corresponding to the first notch and at least one groove at a position corresponding to a size of the cassette, a sliding member slidably disposed between the tray and the positioning plate and having a lower end portion, and a cassette receiving member attached to the lower end portion of the sliding member, said cassette receiving member being capable of moving in front and rear directions through the first and second notches between a lower position and an upper position projecting from the front surface of the tray, said cassette receiving member having at least one engaging piece for engaging the at least one groove in the positioning plate.

8. An X-ray direct photographing table according to claim 7, further comprising a stand, a column extending vertically from the stand, and a holding section vertically movably attached to the column, said cassette tray being attached to the holding section.

\* \* \* \* \*